United States Patent
Schell

[15] 3,681,415
[45] Aug. 1, 1972

[54] CATALYTIC PREPARATION OF CARBOXYLIC ACID ESTERS FROM OLEFINS, ALCOHOLS AND CARBON MONOXIDE IN THE PRESENCE OF AN ALKYL ETHER OR ALKYL KETONE PROMOTER

[72] Inventor: Raymond A. Schell, Berkley, Mich.

[73] Assignee: Ethyl Corporation, New York, N.Y.

[22] Filed: March 20, 1970

[21] Appl. No.: 21,472

Related U.S. Application Data

[63] Continuation-in-part of Ser. No. 671,110, Sept. 27, 1967, abandoned.

[52] U.S. Cl..............260/410.9 R, 260/408, 260/410, 260/410.5, 260/468 M, 260/478, 260/479 R, 260/484 R, 260/485 R, 260/486 AC, 260/497 A

[51] Int. Cl...............................................C07c 67/00

[58] Field of Search..........260/410, 410.9 R, 497 A, 486 AC, 410.5, 479 R, 468

*Primary Examiner*—Lewis Gotts
*Assistant Examiner*—Diana G. Rivers
*Attorney*—Donald L. Johnson

[57] ABSTRACT

A process is described for preparing carboxylic acid esters from olefins, alcohols and carbon monoxide using a combination of tin or germanium salt and a haloplatinum acid as the catalyst and a ketone or ether promoter.

Olefins having from eight to about 24 carbon atoms are preferred reactants. Alkyl ketones having up to 11 carbon atoms and alkyl ethers having up to 16 carbon atoms are useful promoters.

The reaction rate is unexpectedly improved by the promoter.

33 Claims, No Drawings

3,681,415

CATALYTIC PREPARATION OF CARBOXYLIC ACID ESTERS FROM OLEFINS, ALCOHOLS AND CARBON MONOXIDE IN THE PRESENCE OF AN ALKYL ETHER OR ALKYL KETONE PROMOTER

CROSS REFERENCE TO RELATED APPLICATIONS

This application is a continuation-in-part of Ser. No. 671,110, filed Sept. 27, 1967, now abandoned.

BACKGROUND OF THE INVENTION

This invention is directed to an improved process for preparing carboxylic acid esters from olefins, carbon monoxide and alcohols.

The reaction of primary alcohols with olefins and carbon monoxide to produce esters is well known. There are a number of U. S. patents describing the use of various catalysts for this reaction, see for example, U.S. Pat. Nos. 2,542,767, 2,526,742, 2,557,256. An especially useful catalyst system is described in U. S. Pat. No. 2,876,254. The process therein described is directed to the reaction of olefins having up to six carbon atoms with carbon monoxide and an alcohol using as a catalyst a combination of a tin or germanium salt with a Group VIII metal salt. When higher molecular weight olefins such as dodecene are used in this process, the yield of ester product is low and the rate of reaction is poor.

It has been discovered that the rate of carboxylating higher molecular weight olefins using a catalyst of U. S. Pat. No. 2,876,254 is significantly increased by carrying the reaction out in the presence of ethers and ketones as promoters.

SUMMARY OF THE INVENTION

A process for preparing carboxylic acid esters which comprise reacting an olefin having from about two to about 32 carbon atoms with carbon monoxide and an alcohol using a catalyst which is a combination of a salt of tin or germanium with a haloplatinic acid and a promoter selected from alkyl ketones and alkyl ethers.

DESCRIPTION OF THE PREFERRED EMBODIMENTS

An embodiment of this invention is a process for preparing carboxylic acid esters which comprises reacting a $C_2$–$C_{32}$ olefin characterized by (1) having at least one $\alpha$-carbon-to-carbon double bond and (2) having a hydrogen on the 2 carbon atom of said $\alpha$ double bond with carbon monoxide and a $C_1$–$C_{24}$ alcohol in the presence of a catalyst which is a combination of an alcohol soluble salt of a metal selected from the class consisting of tin and germanium with haloplatinic acid and of an alkyl ketone or alkyl ether promoter. A preferred embodiment is the process described above in which the catalyst is a combination of (a) a tin or germanium halide with a haloplatinic acid or (b) a tin or germanium halide with chloroplatinic acid or (c) stannous chloride dihydrate and chloroplatinic acid hexahydrate. $C_1$–$C_{10}$ monohydroxy alkanols are preferred reactant alcohols. Alpha monoolefins are preferred olefins. Dialkyl ketones having up to about 11 carbon atoms are preferred as promoters. A most preferred process is the catalytic process described above wherein methanol is the reactant alcohol and acetone is the promoter.

Organic compounds which are useful reactants in the practice of this invention are olefins (1) having at least one alpha carbon-to-carbon double bond and (2) a hydrogen atom on the 2 carbon atom of said $\alpha$ double bond. These olefins include mono unsaturates, that is, compounds having one $\alpha$ carbon-to-carbon double bond as well as polyunsaturates, that is, compounds having two or more carbon-to-carbon double bonds. Useful olefins may contain other functional groups such as hydroxy, halo, carboxy, nitro and the like. Examples of useful unsaturated organic compounds are 3-chlorooctene-1, 9-hydroxytetradecene-1, and the like. Preferred olefins are the hydrocarbon olefins. Examples of preferred olefins are octene-1, pentadecene-1, tetraisobutylene, cyclooctene, cyclooctadiene-1,5, dodecene-1, eicosene-1, nonene-1, octadecene-1 and the like. Most preferred olefins are the acyclic $\alpha$ olefins. Examples of preferred olefins are tetracosene-1, octadecadiene-1,3, undecadiene-1,4, and the like. Especially preferred hydrocarbon olefins are the $\alpha$-monoolefins, that is, hydrocarbons having only one carbon-to-carbon double bond in the 1,2 position in the molecule. Examples of suitable $\alpha$-monoolefins are ethylene, 4-methylpentene-1, butene-1, 3-methylbutene-1, octene-1, nonene-1, decene-1, tetradecene-1, dodecene-1, 5-ethylhexene-1, pentadecene-1, heptadecene-1, eicosene-1, and the like.

Commercial mixtures of olefins are also quite useful. These commercial mixtures are generally a mixture of various homologous olefins such as $C_4$, $C_6$, $C_8$ olefins; $C_5$, $C_7$, $C_9$, $C_{11}$ olefins; $C_{12}$, $C_{14}$, $C_{16}$ olefins; $C_{12}$, $C_{14}$ olefins; $C_{13}$, $C_{15}$, $C_{17}$ olefins; $C_{11}$, $C_{12}$, $C_{13}$, $C_{14}$, $C_{16}$, $C_{18}$, $C_{20}$, $c_{22}$, $C_{24}$, $C_{26}$, $C_{28}$ olefins, and the like. These mixed olefins are synthesized for example by the Ziegler catalyzed polymerization of low molecular weight olefins such as ethylene or propylene; or by the dehydrogenation of suitable paraffins. The mixed olefins thus obtained might also contain minor amounts of other non-homologous olefins and non-olefin components. In any case, the mixed product obtained from such a commercial synthesis need not be separated into the individual components to be useful. Mixtures of even carbon numbered predominantly $\alpha$ olefins in the $C_8$–$C_{32}$ range having an average molecular weight of $C_{12}$–$C_{14}$ are useful; $C_{10}$–$C_{28}$ range mixtures are particularly useful. Such mixtures containing $C_8$ to $C_{24}$ predominantly $\alpha$-olefins are especially useful. By predominantly I mean that over 60°/o of the olefins are alpha.

Alcohols which are useful reactants include both aryl as well as alkyl hydroxy compounds. Examples of suitable aryl hydroxy compounds are benzyl alcohol, phenol, $C_1$ to $C_{18}$ alkyl phenols, and the like. The preferred alcohols are the alkyl hydroxy compounds having from one to about 10 carbon atoms wherein the alkyl group is composed solely of carbon and hydrogen. The term hydrocarbyl alkanols is used to describe these preferred alcohols. These hydrocarbyl alkanols include cyclic alcohols such as cyclohexanol, cyclopentanol and the like, as well as primary, secondary and tertiary alcohols such as 2-decanol, tert-butanol, 2-ethylhexanol-1 and the like. The most preferred alcohols are the acyclic hydrocarbyl monohydroxy primary alkanols having from one to about five carbon atoms such as ethanol, pentanol-1, butanol and the like. Methanol is an especially preferred alcohol.

The catalysts which are used in effecting the reaction are in general a combination of alcohol soluble salts of tin or germanium with a haloplatinum acid. Preferred haloplatinum acids are those wherein the halogen has an atomic number of at least 17. The chloroplatinum acids are especially preferred. Specific examples of suitable salts of tin and germanium are stannous and stannic chlorides, bromides and iodides, germanium di- and tetrachlorides and germanium tetrabromides, tetraiodides and tetrafluorides, stannous and stannic sulfates and the like and their hydrates. Stannous chloride is preferred either anhydrous or hydrated.

Suitable haloplatinum acids are chloroplatinous acid, bromoplatinic acid, iodoplatinic acid, bromoplatinous acid, and iodoplatinous acid. Chloroplatinic acid is preferred, either anhydrous or hydrated.

An especially useful catalyst combination is $SnCl_2 \cdot 2 H_2O$ and $H_2P$$\cdot 6H_2O$.

Special preparation of the catalysts does not appear to be required. In general, as set out in U.S. Pat. No. 2,876,254, the suitable metal salts are dissolved directly in the alcohol reactant which is being used in the carboxylation. Molar ratios of alcohol soluble tin or germanium salt to haloplatinum acid of from 1:1 to 20:1 can be used in the preparation of the catalysts. The amount of catalyst which can be employed can be varied widely, but is generally about 0.0001 to about 0.2 mole of contained platinum metal per mole of reactant alcohol charged into the reactor.

The promoters which increase the rate of the carboxylation reaction are generally organic compounds of the ketone class. Typical promoters are the alkyl ketones having up to about 11 carbon atoms such as diisobutyl ketone, cyclohexanone, methylethyl ketone, methyl isobutyl ketone, diamyl ketone, cyclohexyl ethyl ketone and the like; and alkyl ethers having from four to about 16 carbon atoms such as morpholine, diethyl ether, 1,4-dioxane, di-$n$-butylether, di-$n$-hexylether, di-2-ethylhexyl ether, $C_1$-$C_4$ dialkyl glycol ethers and polyethers such as 1,2-diethoxy ethane, bis[2(2b-methoxyethoxy)ethyl]ether, bis(2ethyl)ether, 1,2-di-propoxy propane and the like. Mixtures of the promoter compounds can also be used.

Especially preferred promoters are acetone and 1,2-dimethoxy ethane.

As will be illustrated below these promoters unexpectedly improve the rate of the catalytic carboxylation of $C_8$ and higher olefins to produce esters.

The amount of promoter used ranges from about 10 percent to about 70 percent by weight of the total alcohol/olefin charge. Generally, 20 percent to about 60 percent by weight of the promoter can be used.

The action of the promoter is not fully understood. Although not bound by any theory, it is thought that the promoter may function as a complexing agent. Whatever the mechanism, the presence of the promoter unexpectedly improves the overall rate of the carboxylation reaction.

Water is not required in the present process. In other words, the reaction to produce esters will proceed with essentially no water present. However, water need not be excluded from the present process; and, in fact, the process can be carried out in the presence of up to moderate amounts of water. Thus, for example, the reaction to produce esters will proceed when the catalyst components bear water of hydration (e.g. $SnCl_2 \cdot 2H_2O$, $H_2P$$\cdot 4.5\ H_2O$) or when the alcohol reactant is not anhydrous and the like. Excess amounts of water, that is, over about 1.3 moles of water per mole of olefin reactant, should be avoided.

The temperature at which the reaction is carried out may vary over a wide range. In general, temperatures in excess of about 30° C. are used. The temperature range of from about 30° C. to about 325° C. may be employed. Temperatures from about 50° C. to about 275° C. are conveniently used. Temperatures ranging from about 70° C. to about 120° C. are preferred. The process may be carried out under pressure ranging from 500 to about 10,000 pounds per square inch (p.s.i.). Reaction pressures of from about 750 to about 5,000 p.s.i. are conveniently used.

The product obtained in the present carboxylation process is a mixture of ester isomers. This is illustrated by the following reaction equation:

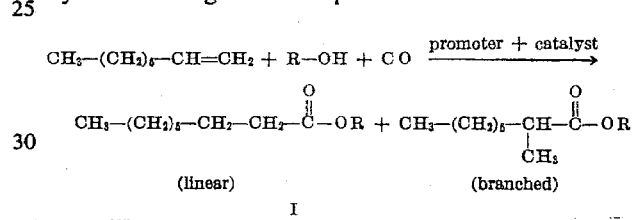

(linear)    (branched)

I

The product obtained thus, is a mixture of linear and branched esters. The major product obtained in the present process is the linear ester. By major product I mean more than about 60 percent by weight of the ester mixture is the linear ester.

This mixture of ester isomers may be separated if desired by any suitable separation methods such as by fractional distillation, by selective absorption, and the like. The mixture of esters may likewise be used as such without any separation of isomers.

As the examples which follow will show, by using the promoter, the rate of the carboxylation reaction is increased substantially. In the following examples all parts are by weight unless otherwise specified.

EXAMPLE 1

No Promoter

A suitably sized autoclave was charged with 22.2 parts of dodecene-1, 24.3 parts of methanol, 1.4 parts of $H_2PtCl_6 \cdot 6H_2O$ and 2.3 parts of $SnCl_2 \cdot 2H_2O$. Carbon monoxide was introduced into the autoclave to a pressure of 2,000 p.s.i. The reaction mass was heated to 75° C. with stirring. The carbon monoxide was then added to a total pressure of 3,000 p.s.i. The reaction was continued at this temperature for 12 hours. During this time a total pressure drop of 500 p.s.i. was recorded. The reaction mass was cooled to room temperature and the autoclave was vented; 54 parts of liquid product was obtained. Analysis of the product by vapor phase chromatography showed that olefin conversion was 86 percent and the yield of methyl tridecanoate and methyl α-methyl dodecanoate based on this conversion was 98 percent.

EXAMPLE 2

With Promoter

A suitable sized autoclave was charged with 14.7 parts of dodecene-1, 16.6 parts of methanol, 16.5 parts of acetone, 1.4 parts of $H_2PtCl_6 \cdot H_2O$ and 2.3 parts of $SnCl_2 \cdot 2H_2O$. Carbon monoxide was introduced to a pressure of 2,000 p.s.i. The reaction mass was heated to 75° C. and CO was introduced to a total pressure of 3,000 p.s.i. The reaction was continued at this temperature for 5 hours, a pressure drop of 310 p.s.i. being recorded. The reaction mass was cooled to room temperature and the autoclave was vented; 64.5 parts of a liquid product was obtained. Analysis of this product by vapor phase chromatography showed that the conversion of olefin was 92 percent and the yield of methyl tridecanoate and methyl α-methyl dodecanoate based on the conversion was 96 percent.

EXAMPLE 3

No Promoter

A suitably sized autoclave was charged with 14.7 parts of dodecene-1, 15.9 parts of methanol, 1.4 parts of $H_2PtCl_6 \cdot H_2O$ and 2.3 parts of the $SnCl_2 \cdot 2H_2O$. Carbon monoxide was introduced to a pressure of 2,000 p.s.i. The reaction mass was heated to 90° C. and carbon monoxide was added to a total pressure of 3,100 p.s.i. The reaction was continued for 1 hour. A pressure drop of 50 p.s.i. was recorded. The reaction mass was cooled to room temperature and the autoclave was vented; 33.8 parts of liquid product was obtained. Analysis of the product by vapor phase chromotography showed that olefin conversion was 50 percent, with the major product being methyl tridecanoate.

EXAMPLE 4

With Promoter

A suitable sized autoclave was charged with 16.2 parts of dodecene-1, 14.4 parts of methanol, 24 parts of acetone, 1.4 parts of $H_2PtCl_6 \cdot H_2O$ and 2.3 parts of $SnCl_2 \cdot 2H_2O$. Carbon monoxide was added to a pressure of 2,000 p.s.i. The reaction mass was heated to 90° C. and carbon monoxide was added to a total pressure of 3,000 p.s.i. The reaction was continued at this temperature for 1 hour, during which a pressure drop of 350 p.s.i. was recorded. The reaction mass was then cooled to room temperature and the autoclave was vented; 59.1 parts of liquid product was obtained. Analysis of the product by vapor phase chromatography showed that the conversion of olefin was 88 percent, the major product being methyl tridecanoate.

The improvement in rate of reaction is clearly illustrated by the examples set out above. Example 3 shows that the reaction of dodecene-1 with CO and methanol in the presence of the mixed tin/platinum catalyst at 90° C. resulted only 50 percent conversion of dodecene-1 after 1 hour. By percent conversion, I mean that percent of the total charge which reacted with the CO and alcohol. In other words, only 50 percent of the dodecene-1 reacted in 1 hour at 90° C. Using the same reactant and catalyst system of Example 3, but adding acetone as a promoter, the conversion of dodecene-1 at 90° C. after 1 hour was increased to 88 percent (Example 4). Thus, the amount of product obtained using the promoter was increased by more than one-half. In Example 1, dodecene-1, methanol and CO were reacted using a tin/platinum alcohol soluble catalyst. After 12 hours at 75° C., the conversion of dodecene-1 was 86 percent. In Example 2, by carrying out the reaction with the same reactants and the same conditions as in Example 1, but adding acetone as a promoter, the same olefin conversion was obtained after only 5 hours. Thus, again the reaction rate was significantly increased as indicated by the substantially shorter reaction time required when using acetone as a promoter. Thus, using the promoter system of the present invention, the rate of carboxylation of olefins to produce esters is substantially increased.

The following examples illustrate the improved reaction rate effected by a promoter when a normally gaseous olefin reactant, namely propylene is used. All parts are by weight unless otherwise indicated.

Example 5

No Promoter

A suitably sized autoclave was charged with 96 parts of methanol, 3.9 parts of $H_2PtCl_6 \cdot H_2O$, 8.4 parts of $SnCl_2 \cdot 2H_2O$. The autoclave was flushed twice with CO. Then, 31.6 parts of propylene was charged to the autoclave; and carbon monoxide was added to a pressure of 2,000 p.s.i. The reaction mixture was heated to 90° C. and the pressure was adjusted with CO to 3,000 p.s.i. The reaction was continued at this temperature for 2 hours during which a pressure drop of 500 p.s.i. was observed. The reaction mass was then cooled to room temperature and the autoclave was vented. 135.2 parts of liquid product were obtained. Analysis of the product by vapor phase chromatography showed that conversion of olefin was 52 percent. The yield of methylbutyrates was 100 percent, of which 62 percent was the linear ester.

EXAMPLE 6

With Promoter

A suitably sized autoclave was charged with 32 parts of methanol, about 120 parts of acetone, 1.3 parts of $H_2PtCl_6 \cdot 6H_2O$, 2.8 parts of $SnCl_2 \cdot 2H_2O$. The autoclave was flushed twice with CO. Then 16 parts of propylene were charged to the autoclave; and carbon monoxide was added to a pressure of 2,000 p.s.i. The reaction mixture was heated to 90° C. and the pressure was adjusted with CO to 3,000 p.s.i. The reaction was continued at this temperature for 2 hours during which a pressure drop of 400 p.s.i. was observed. The reaction mass was then cooled to room temperature and the autoclave was vented. 174.3 parts of liquid product were obtained. Analysis of the product by vapor phase chromatography showed that conversion of olefin was 80 percent. The yield of methylbutyrates was 100 percent, of which 67 percent was the linear ester.

Thus, in Example 5 the conversion of propylene to methylbutyrates was 52 percent. In Example 6, under the same reaction conditions, but in the presence of acetone promoter, the conversion of propylene was increased to 80 percent. The addition of promoter, therefore, improved the conversion by almost 50 percent.

Following is a series of examples illustrating the process of the present invention.

EXAMPLE 7

A suitably sized autoclave was charged with 65 millimoles of 1,7-octadiene, 487 millimoles of methanol, 30 milliliters of acetone, 1.0 grams of $H_2PtCl_6 \cdot H_2O$, 2.3 grams of $SnCl_2 \cdot 2H_2O$, and 1.2 grams of $H_2O$. The autoclave was flushed twice with CO. Then carbon monoxide was added to a pressure of 2,750 p.s.i. The reaction mixture was heated to 100° C. and the pressure was adjusted with CO to 3,175 p.s.i. The reaction was continued at this temperature for 1 hour during which a pressure drop of 525 p.s.i. was observed. The reaction mass was then cooled to room temperature and the autoclave was vented. 62 grams of liquid product were obtained. Analysis of the product by vapor phase chromatography showed that conversion of olefin was 100 percent; and it contained diesters of a dicarboxylic acid (40 percent yield of which 70 percent was linear diester) and monoesters of an unsaturated acid (7 percent yield of which 29 percent was linear ester).

Non-hydrated catalyst component combinations such as $GeCl_2$ and $H_2PtBr_4$; $SnCl_4$ and $H_2PtCl_4$; $GeI_4$ and $H_2PtI_6$ are similarly effective in the process of Example 7.

EXAMPLE 8

A suitably sized autoclave was charged with 90 millimoles of 1-dodecene, 494 millimoles of methanol, 32 milliliters of acetone, 1.0 grams of $H_2PtCl_6 \cdot H_2O$, 2.3 grams of $SnCl_2 \cdot 2H_2O$, and 2.4 grams of $H_2O$. The autoclave was flushed twice with CO. Then carbon monoxide was added to a pressure of 2,750 p.s.i. The reaction mixture was heated to 90° C. and the pressure was adjusted with CO to 3,140 p.s.i. The reaction was continued at this temperature for 1 hour during which a pressure drop of 300 p.s.i. was observed. The reaction mass was then cooled to room temperature and the autoclave was vented. 61.4 grams of liquid product were obtained. Analysis of the product by vapor phase chromatography showed that conversion of olefin was 36 percent; and the yield of methyltridecanoates was 100 percent, of which 83 percent was the linear ester.

EXAMPLE 9

A suitably sized autoclave was charged with 91 millimoles of 1-dodecene, 482 millimoles of methanol, 30 milliliters of acetone, 1.0 grams of $H_2PtCl_6 \cdot H_2O$, 1.7 grams of $GeCl_4$. The autoclave was flushed twice with CO. Then, carbon monoxide was added to a pressure of 2,700 p.s.i. The reaction mixture was heated to 90° C. and the pressure was adjusted with CO to 3,140 p.s.i. The reaction was continued at this temperature for 24 hours during which a pressure drop of 1,180 p.s.i. was observed. The reaction mass was then cooler to room temperature and the autoclave was vented. 58 grams of liquid product were obtained Analysis of the product by vapor phase chromatography showed that conversion of olefin was 82 percent; and the yield of methyltridecanoates was 90 percent, of which 79 percent was the linear ester.

EXAMPLE 10

A suitably sized autoclave was charged with 157 millimoles of hexene-1, 488 millimoles of methanol, 30 milliliters of acetone, 1,4 grams of $H_2PtCl_6 \cdot H_2O$, 2.3 grams of $SnCl_2 \cdot 2H_2O$. The autoclave was flushed twice with CO. Then, carbon monoxide was added to a pressure of 2,700 p.s.i. The reaction mixture was heated to 80° C. and the pressure was adjusted with CO to 3,000 p.s.i. The reaction was continued at this temperature for 1 hour during which a pressure drop of 400 p.s.i. was observed. The reaction mass was then cooled to room temperature and the autoclave was vented. 58.1 grams of liquid product were obtained. Analysis of the product by vapor phase chromatography showed that conversion of olefin was 100 percent; and the yield of methylheptanoates was 50 percent, of which 80 percent was the linear ester.

Similar results are obtained when $H_2PtCl_6 \cdot H_2O$ and $SnBr_2$ or $H_2PtCl_4$ and $GeBr_2$ are used as the catalyst components.

EXAMPLE 11

A suitably sized autoclave was charged with 224 millimoles of 1-dodecene, 50 milliliters of methanol, 75 milliliters of acetone, 1.0 grams of $H_2PtCl_6 \cdot H_2O$, 2.3 grams of $SnCl_2 \cdot 2H_2O$. The autoclave was flushed twice with CO. Then, carbon monoxide was added to a pressure of 2,000 p.s.i. The reaction mixture was heated to 90° C. and the pressure was adjusted with CO to 3,025 p.s.i. The reaction was continued at this temperature for 1 hour during which a pressure drop of 120 p.s.i. was observed. The reaction mass was then cooled to room temperature and the autoclave was vented. 136.2 grams of liquid product were obtained. Analysis of the product by vapor phase chromatography showed that conversion of olefin was 50 percent; and the yield of methyltridecanoates was 87 percent, of which 83 percent was the linear ester.

Replacing 1-dodecene with 1-butene in Example 11 produces a comparable yield of methylpentanoates.

EXAMPLE 12

A suitable sized autoclave was charged with 228 millimoles of 1-dodecene, 50 milliliters of methanol, 75 milliliters of acetone, 2.5 grams of $H_2PtCl_6 \cdot H_2O$, 5.8 grams of $SnCl_2 \cdot 2H_2O$. The autoclave was flushed twice with CO. Then, carbon monoxide was added to a pressure of 2,000 p.s.i. The reaction mixture was heated to 90° C. and the pressure was adjusted with CO to 3,000 p.s.i. The reaction was continued at this temperature for 1 hour during which a pressure drop of 180 p.s.i. was observed. The reaction mass was then cooled to room temperature and the autoclave was vented. 143.7 grams of liquid product were obtained. Analysis of the product by vapor phase chromatography showed that conversion of olefin was 75 percent; and the yield of methyltridecanoates was 91 percent, of which 84 percent was the linear ester.

Comparable yields of the ethyl, isopropyl, n-decyl and phenyl tridecanoates are obtained when ethanol, isopropanol, n-decanol and phenol respectively are used in place of methanol in Example 12.

EXAMPLE 13

A suitably sized autoclave was charged with 268 millimoles of 1-dodecene, 1,000 millimoles of methanol, 50 milliliters of acetone, 2.6 grams of $H_2PtCl_6 \cdot H_2O$, 5.6 grams of $SnCl_2 \cdot 2H_2O$. The autoclave was flushed twice with CO. Then, carbon monoxide was added to a pressure of 2,500 p.s.i. The reaction mixture was heated to 90° C. and the pressure was adjusted with CO to 3,170 p.s.i. The reaction was continued at this temperature for 1 hour. The reaction mass was then cooled to room temperature and the autoclave was vented.

Analysis of the product obtained by vapor phase chromatography showed that conversion of olefin was 99 percent; the yield of methyltridecanoates was 76 percent, of which 80 percent was the linear ester. The product also contained 24 percent internal dodecene isomers.

Analogous results are obtained when the Example 13 reaction is carried out at 50°, 75°, 115°, 125° C. or 150° C.

EXAMPLE 14

A suitably sized autoclave was charged with 268 millimoles of 1-dodecene, 1,000 millimoles of methanol, 100 milliliters of acetone, 2.6 grams of $H_2PtCl_6 \cdot H_2O$, 5.6 grams of $SnCl_2 \cdot 2H_2O$. The autoclave was flushed twice with CO. Then, carbon monoxide was added to a pressure of 2,430 p.s.i. The reaction mixture was heated to 90° C. and the pressure was adjusted with CO to 3,030 p.s.i. The reaction was continued at this temperature for 1 hour. The reaction mass was then cooled to room temperature and the autoclave was vented.

Analysis of the product obtained by vapor phase chromatography showed that conversion of olefin was 100 percent. The yield of methyltridecanoates was 72 percent, of which 83 percent was the linear ester.

Similar results are obtained when non-hydrated chloroplatinic acid and stannous chloride are used in Example 14. Diisobutylketone; 1,3-dioxane; bis(2-butoxyethyl)ether; 1,2-dipropoxyethane; methylethylketone effect similar results when used in place of acetone in Example 14; and either with the hydrated or the non-hydrated catalyst components.

EXAMPLE 15

A suitably sized autoclave was charged with 268 millimoles of 1-dodecene, 1,000 millimoles of methanol, 100 milliliters of acetone, 2.6 grams of $H_2PtCl_6 \cdot H_2O$, 5.6 grams of $SnCl_2 \cdot 2H_2O$. The autoclave was flushed twice with CO. Then, carbon monoxide was added to a pressure of 1,000 p.s.i. The reaction mixture was heated to 90° C. and the pressure was adjusted with CO to 1,500 p.s.i. The reaction mass was then cooled to room temperature and the autoclave was vented.

Analysis of the product obtained by vapor phase chromatography showed that conversion of olefin was 100 percent. The yield of methyltridecanoates was 64 percent, of which 84 percent was the linear ester; and the product also contained 34 percent internal dodecene isomers.

The following table contains data for another series of examples of the carboxylation process in which a promoter is used. In each case, where the analogous reaction is run without a promoter, the rate of carboxylation is significantly lower. The relationship of the two rates of reaction, that is, with a promoter vs. without a promoter, for this series of examples (as well as for Examples 7–15) is of the same general order as that illustrated by the Examples 1 and 2, Examples 3 and 4 and Examples 5 and 6. Conversion in the examples described herein is calculated as follows:

$$\% = \frac{\text{olefin charged} - \text{olefin recovered}}{\text{olefin charged}} \times 100$$

TABLE 1

| Olefin (moles) | Alcohol (moles) | Catalyst (parts:parts) [1] | CO pressure (p.s.i.) | Reaction temperature (° C.) | Promoter (weight percent) [2] | Major ester product [3] |
|---|---|---|---|---|---|---|
| Decene-1 (1) | Ethanol (1) | $GeCl_4$:$H_2PtCl_4$ (5:1) | 1,500 | 80 | Methyl ethyl ketone (50) | Ethyl undecanoate. |
| Pentadecene-1 (1) | Tert-butanol (2) | $GeBr_4$:$H_2PtBr_4$ (20:1) | 6,000 | 85 | Cyclohexanone (40) | Tert-butylhexadecanoate. |
| Dotriacontent-1 (1) | n-Hexanol (1.5) | $GeCl_4$:$H_2PtI_6$ (6:1) | 2,500 | 90 | Diisoamyl ether (10) | n-Hexyl-tritriacontanoate. |
| Hexadecadiene-1,4 (1) | Isopropanol (10) | $GeCl_4$:$H_2PtI_4$ (2:1) | 4,500 | 75 | Tetrahydrofuran (60) | Isopropyl heptadecanoate. |
| Nonadecene-1 (1) | 2-ethyl-n-hexanol (8) | $SnCl_2$:$H_2PtBr_6$ (1:1.1) | 2,100 | 110 | Methyl-tert-butyl ketone (70) | 2-ethyl-n-hexyl eicosanoate. |
| Tetracosene-1 (1) | n-Decanol (6.5) | $GeCl_4$:$H_2PtCl_6$ (2.5:1) | 3,600 | 100 | 1,2-bis[2-(2-butoxy-ethoxy)-ethoxy]ethane (20). | n-Decyl pentacosanoate. |
| Heptadecene-1 (1) | Cyclohexanol (4) | $SnCl_2$:$H_2PtBr_4$ (1:1.5) | 750 | 96 | 1,2-dimethoxy ethane (44) | Cyclohexyl octadecanoate. |
| Octadiene-1,7 (1) | n-Butanol (3.5) | $SnBr_2$:$H_2PtBr_6$ (1:0.1) | 3,000 | 120 | Bis[2-(2-ethoxyethoxy)-ethyl]ether (56). | di-n-Butyl sebacate. |
| Octadecene-1 (1) | 2-pentanol (9) | $SnSO_4$:$H_2PtI_6$ (6:1) | 1,000 | 70 | 1,3-dioxane (32) | 1-methyl-n-butyl nonadecanoate. |
| Pentene-1 (1) | 4-nonanol (5) | $SnCl_4$:$H_2PtVl_4$ (3:1) | 10,000 | 82 | Diisobutyl ketone (66) | 1-n-pentyl hexanoate. |

[1] Weight ratio; also either or both catalyst components may be hydrated or non-hydrated.
[2] Based on total reactant charge.
[3] Branched isomers are also produced as illustrated by Equation I above.

The ester products of the present reaction have many uses in the chemical field. For example, the esters may be used as solvents; as plasticizers for resins such as polyvinylchloride, and the like; as chemical intermediates in ester interchange reactions. The esters may also be hydrolyzed to yield acids which are useful as detergent intermediates.

The tin or germanium salts and noble metal acids used as catalysts in the present invention are, in general, soluble in alcohol. Soluble in alcohol means soluble in a lower alkanol such as ethanol, methanol, isopropanol and the like. Salts of these metals and noble metal acids which are not soluble in alcohol but which are soluble in the olefin and/or the promoter can also be used. On the other hand, tin or germanium salts and noble metal acids which are not soluble in any component of the reaction system can also be used. In this case, the combination of tin or germanium salts and noble metal acids may be dispersed directly in the reaction system using methods known in the art; or the catalyst metal salts and noble metal acids may be used deposited on an inert support.

The process of this invention is properly described above. The examples presented serve to illustrate, but are not meant to limit this invented process. It is intended that this invention be limited only within the

I claim:

1. A process for preparing carboxylic acid esters which comprises reacting $C_2$–$C_{32}$ olefin, characterized by having
   A. at least one alpha carbon-to-carbon double bond, and
   B. a hydrogen on the 2-carbon atom of said α-double bond, with carbon monoxide and a $C_1$–$C_{24}$ alcohol reactant at an olefin:alcohol reactant ratio of 1:1 to 1:10 in the presence of
      a. from 0.0001 to 0.2 mole of contained platinum metal per mole of alcohol reactant, of a catalyst which is a combination of
         i. an alcohol soluble salt of a metal selected from tin and germanium, and
         ii. a haloplatinum acid wherein the molar ratio of said salt:said acid is from 1:1 to 20:1, and from 10%/o to about 70%/o by weight, based on the total olefin/alcohol reactant, of
      b. a promoter selected from the class consisting of
         i. alkyl ketones having up to 11 carbon atoms and one

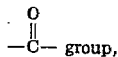

ii. alkyl ethers having from four to about 16 carbon atoms and up to 6 —O— groups, and
         iii. morpholine.

2. The process of claim 1 wherein said alcohol reactant is a $C_1$–$C_{10}$ alkanol.

3. The process of claim 2 wherein said alkanol is a $C_1$–$C_5$ monohydroxy primary alkanol.

4. The process of claim 3 wherein said alkanol is methanol.

5. The process of claim 1 wherein the molar ratio of olefin:alcohol reactant is from 1:1 to about 1:6.

6. The process of claim 5 wherein said olefin:alcohol molar ratio is 1:2 to about 1:6.

7. The process of claim 1 wherein the reaction temperature is from about 50° C. to about 275° C. and the reaction pressure is from about 500 to about 10,000 pounds per square inch.

8. The process of claim 7 wherein said reaction temperature is from about 70° C. to about 120° C. and said reaction pressure is from about 750 to 5,000 pounds per square inch.

9. The process of claim 8 wherein said olefin:alcohol reactant ratio is 1:1 to about 1:6 and said alcohol reactant is a $C_1$–$C_{10}$ alkanol.

10. The process of claim 9 wherein said alkanol is a $C_1$–$C_5$ monohydroxy alkanol.

11. The process of claim 1 wherein said promoter is alkyl ketone.

12. The process of claim 1 wherein said promoter is alkyl ether.

13. The process of claim 1 wherein said alcohol soluble salt is a halogen salt of tin or germanium.

14. The process of claim 13 wherein said alcohol soluble salt is a halogen of tin.

15. The process of claim 13 wherein said haloplatinum acid is haloplatinic acid.

16. The process of claim 14 wherein said haloplatinum acid is chloroplatinic acid.

17. Tee process of claim 1 wherein said olefin is a monoolefin.

18. The process of claim 17 wherein said alcohol reactant is a $C_1$–$C_{10}$ alkanol.

19. The process of claim 18 wherein said promoter is alkyl ketone.

20. The process of claim 19 wherein said alkanol is a $C_1$–$C_5$ monohydroxy alkanol.

21. The process of claim 20 wherein said alkanol is methanol.

22. The process of claim 19 wherein said promoter is acetone.

23. The process of claim 18 wherein said promoter is an alkyl ether.

24. The process of claim 23 wherein said alkyl ether is 1,2-dimethoxy ethane.

25. The process of claim 8 wherein said olefin is $C_8$–$C_{24}$ olefin, said alcohol reactant is $C_1$–$C_{10}$ monohydroxy alkanol, said olefin:alcohol reactant molar ratio is 1:1 to about 1:6, and said alcohol soluble salt is a halide of germanium or tin.

26. The process of claim 25 wherein said olefin is an α-monoolefin.

27. The process of claim 25 wherein said promoter is alkyl ketone.

28. The process of claim 25 wherein said promoter is alkyl ether.

29. The process of claim 25 wherein said alkanol is a $C_1$–$C_5$ alkanol.

30. The process of claim 29 wherein said alkanol is methanol.

31. The process of claim 30 wherein said promoter is acetone.

32. The process of claim 31 wherein said olefin is propylene.

33. The process of claim 31 wherein said olefin is dodecene.

* * * * *